INVENTOR.
Hugh R. Sproul,
BY Wolfe, Hubbard, Voit & Osann
Attorneys.

March 21, 1967 H. R. SPROUL 3,310,656
CONDITION CONTROLLING APPARATUS, PARTICULARLY FOR
CONTROLLING TEMPERATURES
Filed July 12, 1963 4 Sheets-Sheet 2
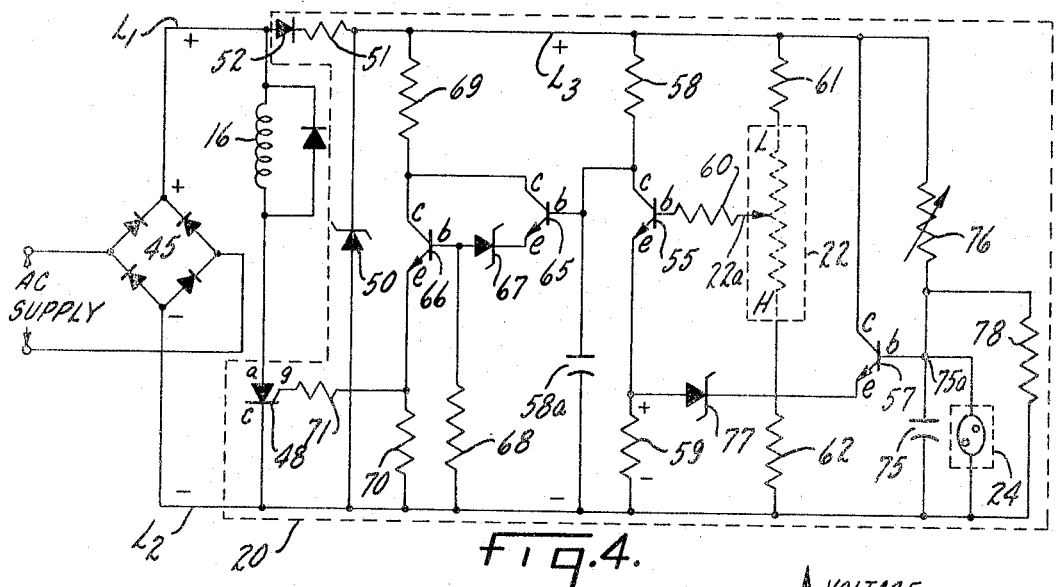
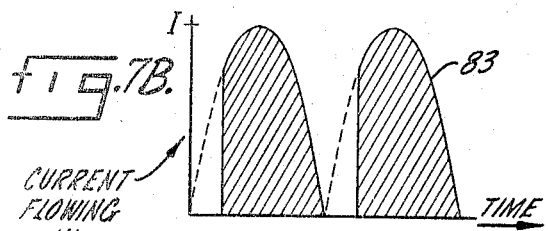
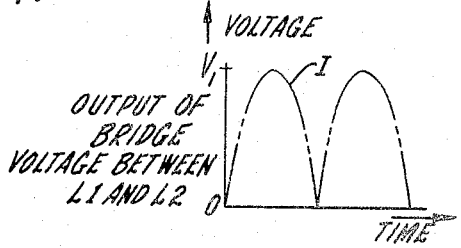
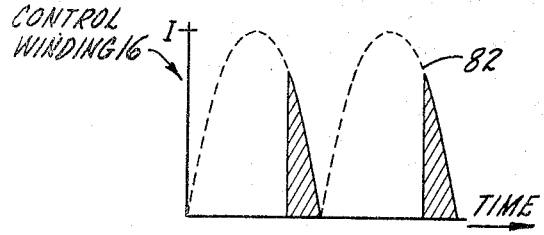
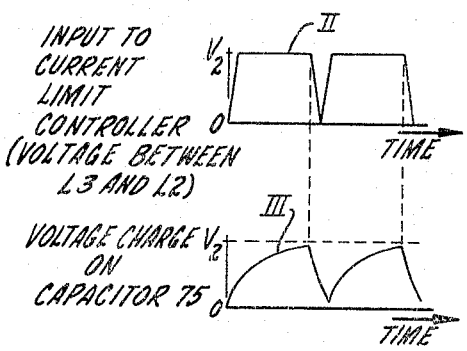
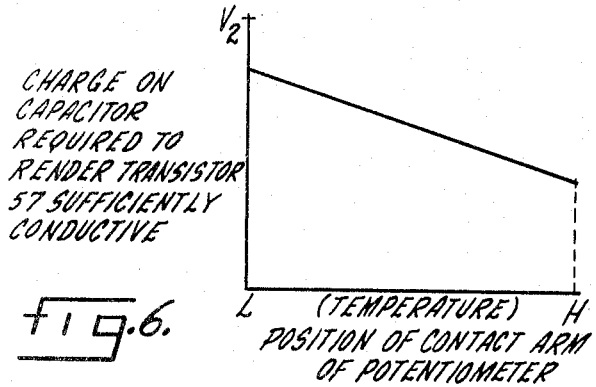
INVENTOR.
Hugh R. Sproul,
BY
Wolfe, Hubbard, Voit & Osann
Attorneys.

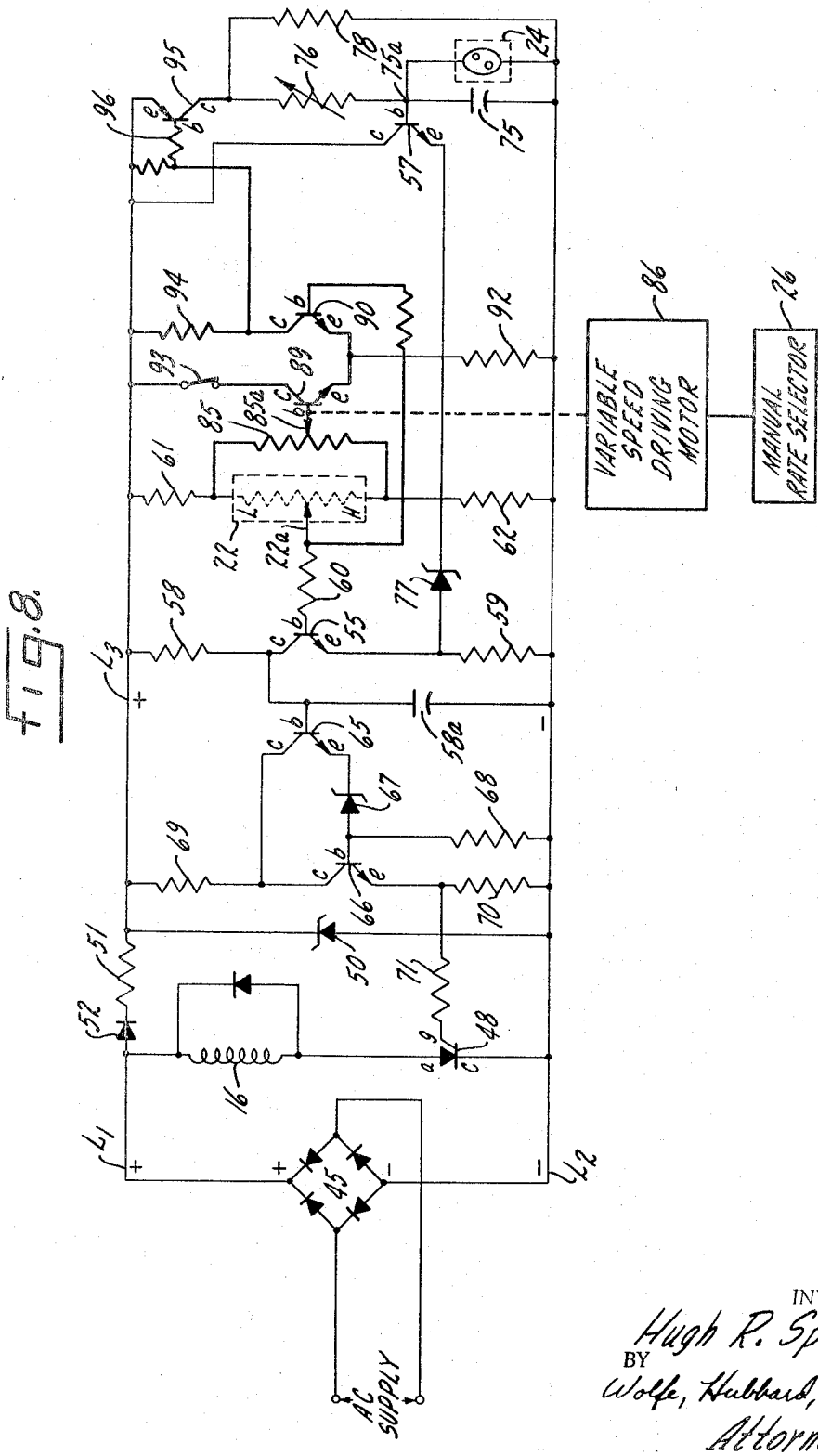

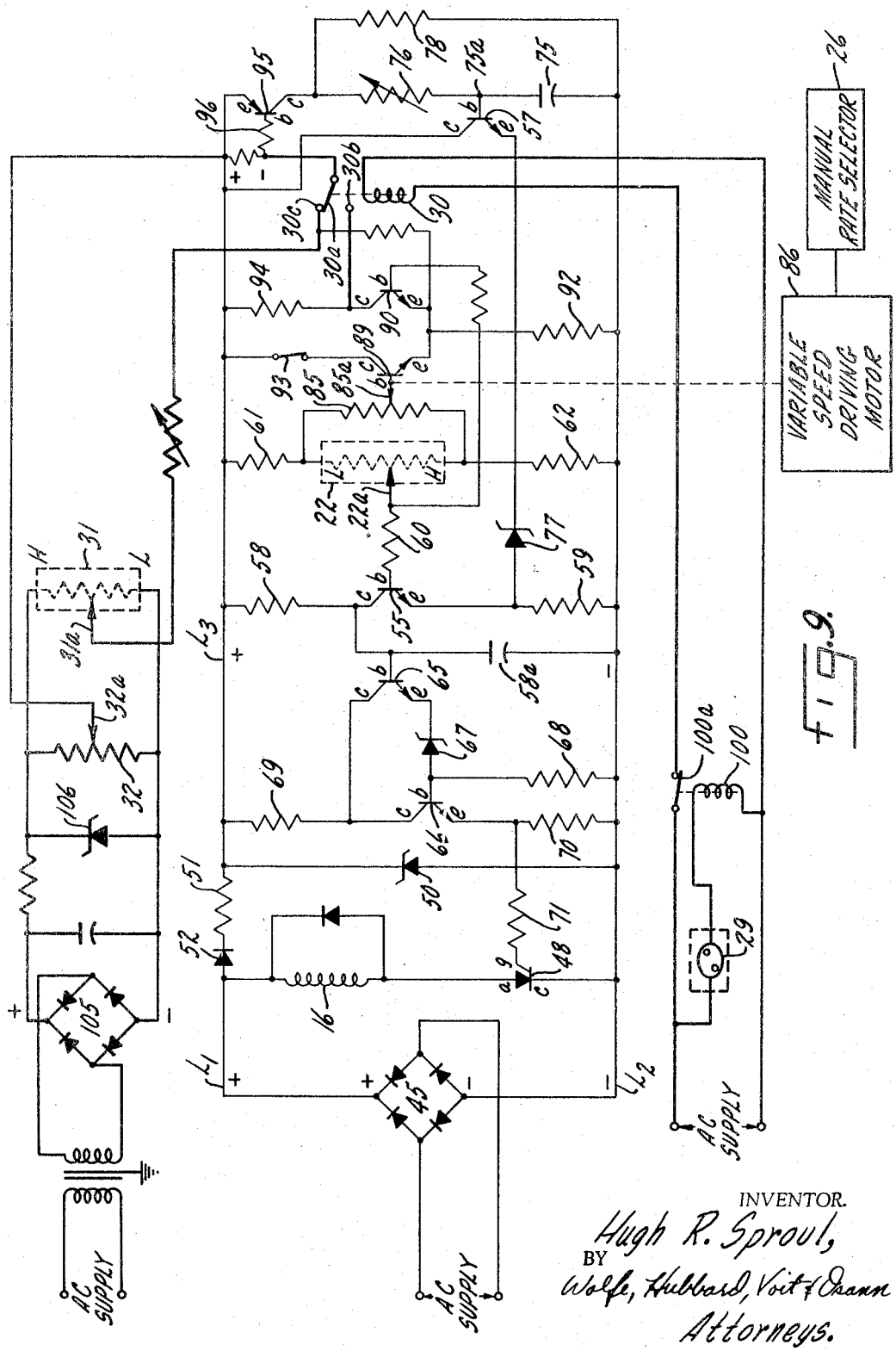

United States Patent Office 3,310,656
Patented Mar. 21, 1967

3,310,656
CONDITION CONTROLLING APPARATUS,
PARTICULARLY FOR CONTROLLING
TEMPERATURES
Hugh R. Sproul, Rockton, Ill., assignor to Ipsen Industries, Inc., Rockford, Ill., a corporation of Illinois
Filed July 12, 1963, Ser. No. 294,504
22 Claims. (Cl. 219—503)

The present invention relates in general to apparatus for controlling a variable condition, and in particular to apparatus for controlling the power supplied to an energy utilization device in order to change a variable condition from one value to another. While not so limited in its uses, the invention finds especially advantageous application in controlling the temperature of a furnace or oven heated by an electrically energized heating element.

It is the general aim of the invention to provide condition controlling apparatus, and particularly for controlling temperatures in an electric oven, which supplies power to the energy utilizing element at a maximum rate, consistent with the limitations of power supply and despite the fact that the characteristics of the system change as the controlled condition takes on different levels or values.

More specifically, it is an object to provide a condition controlling apparatus which operates to rapidly change the controlled condition from a first to a second level at the fastest rate and in the shortest time feasible, while nevertheless automatically limiting the rate of change sufficiently to avoid overtaxing the controlled apparatus or its energy source.

A related object is to provide such rapid changes in the value of a controlled condition (e.g., temperature) by very compact, simple and rugged control apparatus.

Still another object is to make possible the starting of an electric furnace or the like so that the temperature is increased from a low value to a high final value very quickly, but without exceeding a predetermined limitation in the maximum rate at which energy is drawn from the supply source, and without the need for an operator to be in attendance in order to make frequent manual adjustments.

It is a further object to provide such apparatus for controlling a variable condition, and in which the condition may be changed from one value to another at a predetermined adjustable slope while nevertheless assuring that a predetermined maximum rate of energy transfer is not exceeded.

Still another object of the present invention is to provide such apparatus for controlling a variable condition, and in which the rate of energy supplied to the energy utilization device is made to vary in proportion to the error from the desired value of the condition, while nevertheless assuring that the predetermined maximum rate of energy transfer is not exceeded.

Other objects and advantages of the invention will become apparent as the following description proceeds, taken in conjunction with the drawings, in which:

FIG. 4 is a schematic diagram illustrating details of a current limit controller and a portion of a potentiometer recorder shown in block form by FIG. 1;

FIG. 5 is a graphical representation of certain recurring waveforms which occur in the current limit controller (FIG. 4) during operation thereof;

FIG. 6 is a graphical representation of voltage values versus temperature potentiometer arm position, such voltage values being those which must be exceeded by recurrently charging a capacitor in order to render a transistor in FIG. 4 conductive;

FIGS. 7A and 7B are graphical illustrations of the current waveform supplied to the control winding of a saturable reactor under two respective conditions;

Figures 1, 2:
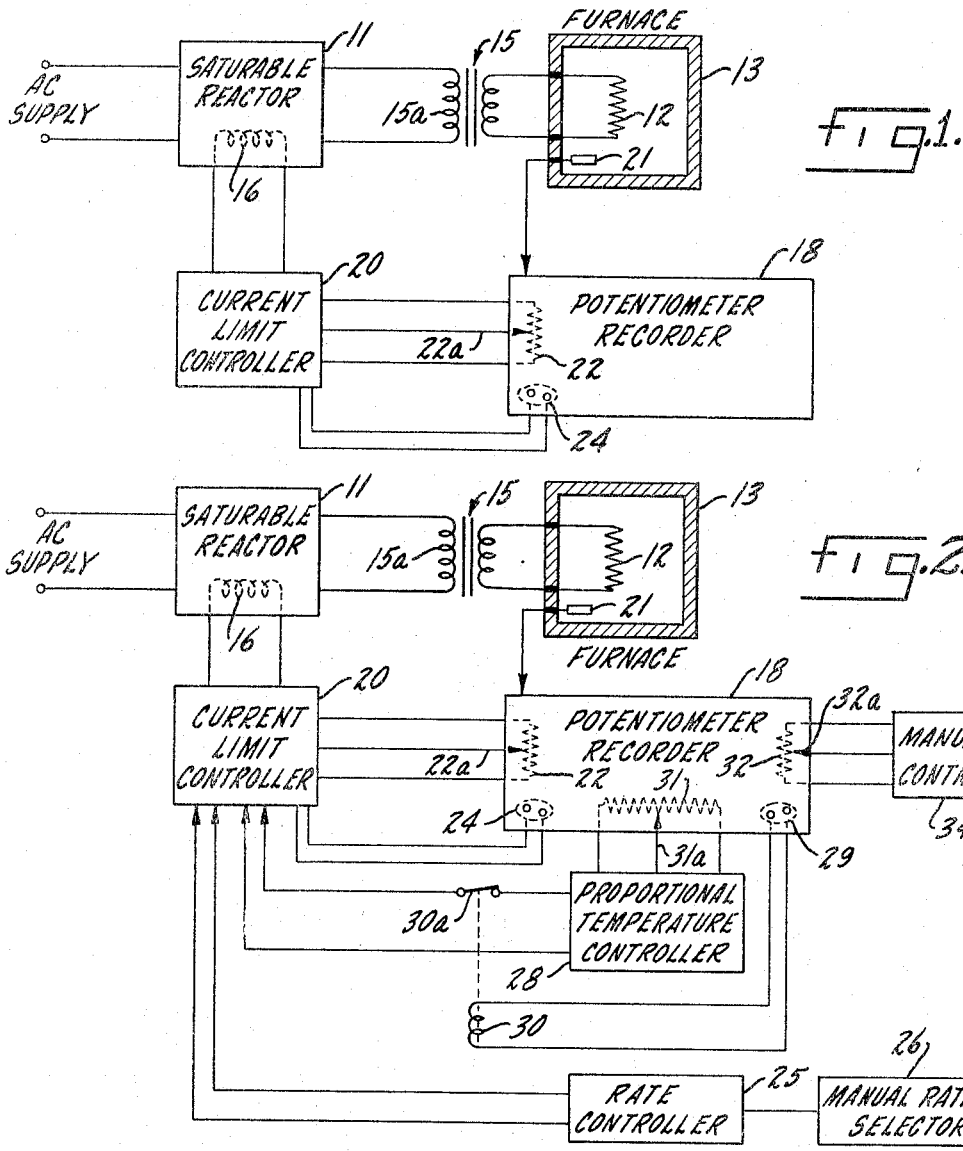
FIGURE 1 is a bolck diagram of a temperature control system constituting a preferred but exemplary embodiment of the present invention.
FIG. 2 is similar to FIG. 1, but shows a modified embodiment which provides also rate control of temperatures and proportional control in the region of the final operating temperature.
Figure 3:
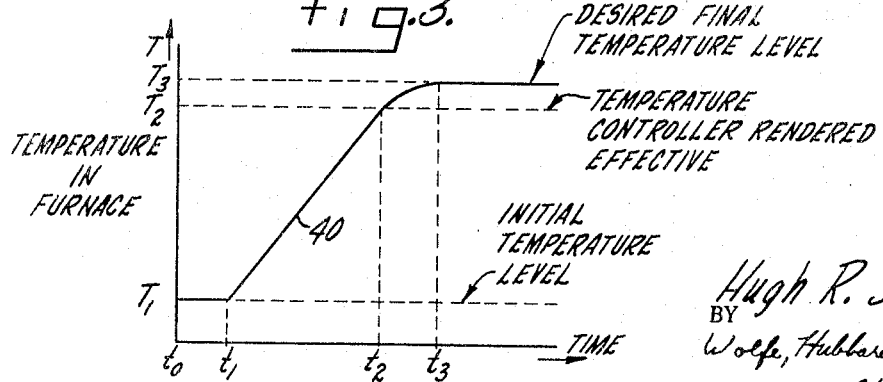
FIG. 3 is a graph illustrating the idealized relationship between temperature in the furnace in FIG. 1 and time during a typical operating cycle.

FIG. 8 is a schematic diagram similar to FIG. 4 wherein a rate controller illustrated in block form in FIG. 2 is also schematically illustrated in conjunction with the current limit controller; and FIG. 9 is a schematic diagram similar to FIG. 8 wherein the rate controller and the proportional temperature controller illustrated in block form by FIG. 2 are also schematically shown in conjunction with the current limit controller.

While the invention has been shown and will be described in some detail with reference to particular, exemplary embodiments thereof, there is no intention that it be limited to such detail. On the contrary, it is intended here to embrace all modifications, alternatives, and equivalents falling within the spirit and scope of the invention as defined by the appended claims.

In describing the present invention, the operation thereof will be set forth in conjunction with controlling the temperature level in a furnace or the like. However, this is merely an illustration of only one environment in which the invention may find advantageous use, and it is to be understood that the invention may find use in controlling any condition which is to be varied from an initial operating level to a final operating level.

*Current limiting control*

Referring to FIG. 1, a saturable reactor 11 is provided for controlling the transmission of power from an A.C. source to a heating element or resistor 12 within a furnace 13, the power being transmitted through a voltage stepdown transformer 15. The saturable reactor controls the flow of current through the primary winding 15a of the transformer so that the current flowing through the heater element 12 and thus the temperature in the furnace 13 are controlled thereby.

As is well known, a saturable reactor comprises an inductive reactance which varies inversely in value with changes in the average or direct current applied to a control winding. Accordingly, the impedance or reactance of the saturable reactor 11 interposed between the A.C. supply and the transformer 15 may be increased or decreased by decreasing or increasing the current applied to the control winding 16, thereby decreasing or increasing the voltage and current applied to the heating element 12. For the details of a typical saturable reactor, reference may be made to pages 3–48 of the fourth edition of the Electrical Engineer's Handbook on Electric Communication and Electronics prepared under the direction of Harold Pender and Knox McIlwain.

In starting up the electric furnace 13, it is often desirable to raise the temperature therein from a cold or ambient level up to a selected operating temperature (e.g., 2000° F.) in a minimum of time, and without careful attention on the part of the operator. If the furnace is just turned "full on" by supplying a very high current to the control winding 16, the current drawn from the A.C. supply may very well exceed its rated capacity, and may overload the connecting conductors or cables and the heating element. This is especially true in those cases where the heating element or resistor 12 has a relatively large temperature coefficient of resistance. For example, certain types of heating elements such as molybdenum alloys exhibit a 10 to 1 increase in resistance as their temperature is raised about 2000° F. When such an element is at a cold, ambient temperature, its resistance is so low that it will draw excessively high or overloading currents if the reactance of the saturable reactor is reduced to its lowest value by a large current passed through the control winding 16. It is necessary, then, as a practical matter to insert some current limiting resistance or reactance in series between the A.C. supply and the heater 12 when the latter is first turned on at a cold or ambient temperature. This is done by supplying a relatively low current to the control winding 16, so that the reactor 11 has an appreciable reactance.

On the other hand, as the heater element 12 increases in temperature, its resistance increases markedly. Thus, if the control winding 16 continues to receive the same limited control current, the current drawn by the heater element 12 would drop off as its temperature increases, thereby undesirably reducing the rate of heat generation and slowing down the rate at which the furnace temperature increases. To keep the current from decreasing as the temperature increases, it is necessary to reduce the reactance of the saturable reactor.

In starting up cold furnaces having heating elements with high temperature coefficients of resistance, and in order to get the furnace up to a desired high operating temperature as quickly as possible, it has been necessary in the past for an operator to make frequent manual adjustments in the value of the current controlling series impedance, or in the control current for a saturable reactor which forms such an impedance. The impedance is started out at a high value to safely limit current to the capacity of the supply source, and then progressively decreased in order to keep the current from falling below its maximum or near maximum value as the temperature and the resistance of the heating element increase. The choice has been either to insert a high valued fixed impedance to limit initial current and thereby have the furnace heat up relatively slowly, or to have an operator in attendance to make frequent adjustments in such impedance in order to bring the furnace rapidly from ambient up to a high operating temperature.

In accordance with the present invention, means are provided for automatically supplying power to the energy utilizing device (heating element 12) at a desired, but safely limited, maximum rate (determined by the capacity of the energy source and connecting cables) when the controlled condition (temperature) is at a first level, and then also for automatically maintaining substantially that maximum rate even though changes in the controlled conditions (i.e., increases in temperature and increases in resistance of the heating element 12) would normally otherwise cause the rate of energy conversion to decrease. In the illustrated form of the invention, the saturable reactor 11 is employed, and the exciting current through the control winding 16 is varied by the current limit controller 20. It will be understood, however, that the saturable reactor is employed simply as one form of an amplifying transducer, and that in some instances the current limit controller may be connected directly to energize the energy-utilization element.

As shown in FIG. 1, the apparatus employed in conjunction with the current limit controller includes temperature sensing means for producing a signal or voltage which varies or changes in accordance with the value of the actual temperature in the furnace 13. As here shown, a temperature sensing element or thermocouple 21 is connected to a slidewire potentiometer 18, the latter preferably being of the recording type well known to those skilled in the art. Briefly stated, the recording potentiometer 18 includes a resistance potentiometer 22 engaged by a wiper or contact arm 22a which is moved (by means not shown) in response to signals from the sensing element 21 to positions indicative of the sensed furnace temperature. A normally open mercury switch 24 in the potentiometer 18 is caused (by means not shown) to be actuated and closed whenever the sensed temperature reaches a desired, upper level—the value of such upper level being selectable by a manual setting mechanism (not shown).

The current limit controller 20 accepts the temperature-representing signal provided on the wiper 22a and automatically supplies an effective or average control current to the control winding 16 in order that the power supplied to the heating element 12 has a desired, near-maximum value, but limited so as not to be excessive when the furnace 13 is first started up and the resistance of the element 12 is low. As the furnace temperature increases rapidly, and the resistance of the element 12 increases, the temperature-representing signal from the potentiometer changes correspondingly. The controller 20 then increases the control current through the winding 16 in order that the power current passed through the heating element does not decrease, but on the contrary is maintained at a high but safe value. This assures that as the furnace 13 heats up, the energy continues to be fed at a desired rate so that the heating continues as fast as is reasonably possible.

The organization of the current limit controller 20 is schematically shown in FIG. 4. Associated therewith are means for providing input power, such means here shown as a full wave rectifier bridge network 45 energized from an A.C. supply and producing a full wave rectified A.C. voltage between the lines L1 and L2. The waveform for this full wave rectified voltage is shown at I in FIG. 5.

As may be seen, the flow of current through the control winding 16 of the saturable reactor is regulated by a static-latching switch 48, illustrated as a silicon controlled rectifier having an anode, a cathode, and a gate electrode respectively designated as $a$, $c$, and $g$. In this instance, the silicon controlled rectifier is normally non-conducting and is triggered to conduction by the application of a triggering signal or positive voltage pulse to the gate electrode thereof, i.e. driving the gate electrode positive with respect to the cathode. The current limit controller 20 is designed to cause a triggering signal to be applied to the gate electrode at an instant during each half cycle of the rectified A.C. supply determined by the instantaneous temperature in the furnace.

The full wave rectified pulsating voltage appearing between the lines L1 and L2 is clipped to a predetermined voltage level, for example 22 volts, by a Zener diode 50 which is connected across the output of the bridge network 45 through a resistor 51 and a diode 52. A pulsating or recurring voltage is developed across the resistor 51 which corresponds to the difference between the rectified A.C. supply and the predetermined voltage determined by the Zener diode. The diode 52 is provided to prevent feedback of current from the controller 20 to the bridge network 45. Thus, the voltage appearing between lines L3, L2 is a pulsating, flat-topped recurring wave having an amplitude V2 (e.g., 22 volts) and a frequency the same as the pulsating voltage between lines L1, L2. Its waveform is shown at II in FIG. 5.

For the purpose of causing a triggering signal to be applied to the gate electrode of the rectifier 48 so that the latter is triggered into conduction at the proper instants during each pulse or cycle of the waveform I, a triggering transistor 55 of the NPN type is provided which is normally conductive and which causes a triggering signal to be applied to the gate electrode $g$ when rendered nonconductive. As will become apparent later, the triggering transistor 55 is rendered nonconductive when a control transistor 57, also of the NPN type, is rendered sufficiently conductive. The collector and the emitter of transistor 55 are respectively connected to the lines L3 and L2 through resistors 58 and 59 and the base thereof is connected to contact arms 22a of the previously-mentioned control potentiometer 22 through a current limiting resistor 60. The potentiometer 22 is also connected by resistors 61, 62 across lines L3, L2 so that the wiper 22a forms a voltage divider providing a fraction of the L3–L2 voltage thereat, such fraction being determined by the position of the wiper 22a. Thus, as the temperature of the furnace increases, the arm 22a moves from L to H and the voltage at the arm 22a decreases. It follows then that the contact arm 22a is positive with respect to line L2, except when the clipped, rectified A.C. voltage (see waveform II, FIG. 5) is at the zero potential, so that the base of transistor 55 is normally maintained positive with respect to the emitter thereof. Therefore, transistor 55 is normally conducting during the time period of each voltage pulse appearing between lines L3, L2.

When the transistor 57 is rendered conductive, current flows via the collector c and the emitter e thereof through the resistor 59 associated with the emitter of transistor 55. When such current is sufficiently great, it causes a sufficient voltage drop to be developed across resistor 59 to drive the emitter e of transistor 55 to the same potential or positive with respect to the base b thereof. Under these circumstances, transistor 55 is rendered nonconductive. Accordingly, the potential at the collector c of transistor 55 swings more positive, so that a triggering signal is applied to the gate electrode of the controlled rectifier 48 and current is permitted to flow through the control winding 16 for the remainder of the existing half cycle of the rectified A.C. supply.

For the purpose of causing a triggering signal to be applied to the gate electrode when transistor 55 is rendered nonconductive, a pair of transistors 65 and 66 are provided which are of the NPN type. The base of transistor 65 is connected to the collector of transistor 55, the emitter thereof is connected to line L2 through a Zener diode 67 and a resistor 68, and the collector thereof is connected to line L3 through a resistor 69. The base of transistor 66 is connected to the upper end of resistor 68, the collector thereof is connected to line L3 through the resistor 69 and the emitter thereof is connected to line L2 through a resistor 70. The gate electrode of the rectifier 48 is connected to the emitter of transistor 66 through a current limiting resistor 71 so that a triggering signal is applied thereto when transistor 66 is conducting, the voltage drop across resistor 70 supplying the gate electrode to cathode triggering potential.

The Zener diode 67 is so selected that it will not conduct current until the transistor 55 is substantially cut off. In this way, conduction of transistor 65 is prevented until the potential at the upper end of resistor 59 equals or exceeds the potential at the contact arm 22a. However, when transistor 55 is rendered nonconductive, the collector thereof rises toward the potential of line L3, so that the Zener diode 67 breaks down and transistor 65 is rendered conductive, causing current to flow through resistor 68. Consequently, the base of transistor 66 is driven positive with respect to its emitter so that conduction thereof is initiated and a positive triggering pulse is applied to the gate electrode of the rectifier 48. As a result, the rectifier 48 is rendered conductive so that current flows through the control winding 16 for the remainder of the then existing half cycle of the rectified A.C. supply.

A small capacitor 58a connected between resistor 58 and line L2 constitutes a spike filter which prevents noise or short pulses from turning on transistor 65 and also limits the maximum output.

For the purpose of triggering the transistor 57 to conduction at the proper instants during each voltage pulse appearing between lines L3, L2, means are provided for creating a smoothly rising, recurring signal or voltage, preferably one which rises exponentially during each cycle or pulse of the recurring waveform II. In the present instance, an R-C timing circuit in the form of an adjustable resistor 76 and a capacitor 75 is connected across lines L3, L2. The voltage appearing across the capacitor 75 thus has the recurring waveform shown at III in FIG. 5. Provision is made to trigger the gate-controlled rectifier at those instants when the smoothly rising, recurring waveform III reaches a predetermined magnitude in relation to the temperature-representing voltage appearing at the control arm 22a. To do this, the base of transistor 57 is connected to the terminal 75a of the capacitor 75 so that the collector-emitter current flows in transistor 57 when the voltage at 75a rises to a predetermined level. During each half cycle of the rectified and clipped A.C. supply (see waveform II, FIG. 5), the capacitor 75 charges exponentially through resistor 76 toward the clipped voltage level V2, as shown by waveform III in FIG. 5. When the charge on the capacitor 75 has reached a voltage level which exceeds the summation of the voltage drop across resistor 59 due to conduction of transistor 55 and the breakdown voltage of a Zener diode 77 connected in series with the emitter of transistor 57, transistor 57 is rendered conductive. Subsequently, as the charge on capacitor 75 increases, the transistor 57 becomes more and more conductive. As previously mentioned, when transistor 57 is sufficiently conductive, transistor 55 is rendered nonconductive so that the rectifier 48 is triggered to conduction. During the latter half of each half cycle the rectified A.C. supply when the supply to the current limit controller drops below the charge on capacitor 75, the capacitor begins to discharge through a resistor 78 connected in parallel with capacitor 75. The resistor 78 is so chosen that the capacitor rapidly discharges therethrough as illustrated by waveform III (FIG. 5). Accordingly, the capacitor 75 is conditioned for charging during the next subsequent half cycle of the rectified A.C. supply. Resistor 76 is adjustable, as illustrated, so that the time required for capacitor 75 to charge to the required voltage level to cause transistor 57 to be sufficiently conductive may be varied. This, in turn, determines the value of the current which is automatically supplied to the heating element 12 as the furnace 13 is started up.

As previously set forth, the control potentiometer 22 has a temperature-responsive contact arm 22a and is so connected in the circuit that, when the temperature in the furnace is at a low level, contact arm 22a is in engagement with the uppermost portion of the potentiometer. Conversely, when the temperature in the furnace is at a high level, the contact arm 22a is in engagement with the lowermost portion of the potentiometer. Accordingly, as the temperature in the furnace increases, the base of transistor 55 becomes less and less positive in potential with respect to the emitter. It follows that, as the temperature in the furnace increases, less current flowing through resistor 59 from transistor 57 is required to render the transistor 55 substantially nonconductive. Consequently, during each cycle of the waveform II, capacitor 75 charges to a level to render transistor 57 sufficiently conductive to cut off transistor 55, and this level is reached at progressively earlier instants as the furnace temperature increases. Thus, as the temperature in the furnace increases, a triggering signal is applied to the gate electrode of rectifier 48 at progressively earlier instants in each half cycle of the waveform I. This means that a greater average current flows through the control winding 16 of the saturable reactor, and the impedance of the saturable reactor decreases as the furnace temperature increases and the resistance of the heater element 12 increases. Thus, while the current supplied to the heater element 12 is initially limited to a safe or rated value, such current does not materially decrease when the furnace temperature increases, and the final desired operating temperature will be reached more quickly than would otherwise be possible.

The relationship between the charge on capacitor 75 required to cause transistor 57 to be rendered sufficiently conductive so that rectifier 58 is rendered conductive is illustrated graphically in FIG. 6. It will be seen that as the furnace temperature increases (i.e., as the contact arm 22a moves downwardly and the potential thereat decreases), the critical voltage across capacitor 75 necessary to render transistor 57 sufficiently conductive to "turn off" transistor 55 decreases. As a result, the capacitor in exponentially charging during each cycle of the waveform II reaches the critical voltage earlier as the furnace temperature increases.

Additionally, the graphs 82 and 83 in FIGS. 7A and 7B show the current flowing through the control winding 16 when the temperature in the furnace is at a low level and when the temperature is at a high level respectively. Curve 82 illustrates current flowing through the control winding when the temperature in the furnace is at a low level and, as may be seen, current is only permitted to flow therethrough during the latter portion of each half cycle of the rectified A.C. supply. Conversely, the curve 83 depicts a condition of current flow through the control winding when the temperature in the furnace is at a high level and, as may be seen, current is permitted to flow therethrough early in each half cycle of the A.C. rectified supply. The average D.C. current in the former case is much lower than in the latter case, so that the effective impedance of the saturable reactor is greater when the furnace temperature is low, and decreases as the furnace temperature increases.

For the purpose of holding the furnace temperature constant after it reaches the desired final value, the previously-described mercury switch 24 is connected across capacitor 75. When the desired final temperature is reached, the switch 24 closes and shunts the capacitor 75. As a result, the base of transistor 57 is connected directly to line L2, and this is maintained negative with respect to the emitter. Under these conditions, transistor 57 is maintained nonconductive and transistor 55 will be maintained conductive so that no triggering signal may be applied to the gate electrode of the rectifier. Accordingly, no current is permitted to flow through the control winding 16 of the saturable reactor 11, and the impedance of the latter has a maximum value. In effect, the current drawn by heater element 12 is thus reduced to such an extent that the furnace may actually cool off due to heat losses. However, if the furnace temperature does fall below the desired operating value, then the mercury switch 24 will reopen and the controller 20 will again be effective to decrease the impedance of the saturable reactor. Thus, the furnace will be held at the desired final temperature by on-off control action.

*Current limit control and rate control*

As thus far described, the current limit controller 20 (FIGS. 1 and 4) operates to limit the initial current drawn by the furnace heating element 12 and yet to prevent marked decreases in current as the temperature in the furnace rises. The system thus far described operates basically as an on-off control except for the automatic limitation of initial current and maintenance of near-maximum current as the furnace temperature increases at a rapid rate (i.e., the saturable reactor in effect turns the furnace full on or full off once the desired final temperature level is attained).

In many furnace control applications, it is often desirable to increase the temperature, not at the maximum rate, but instead at an adjustable, predetermined slope, i.e., at a certain ramp or number of degrees per hour. Such ramp or slope function heating is often employed, for example, in annealing furnaces. In keeping with one aspect of the present invention, the current limit controller 20 forms, by relatively minor additions, a system which provides for rate or slope control of temperatures, and at the same time performs its current limiting function.

In accordance with this aspect of the present invention, means are provided for controlling the rate at which the controlled condition (e.g. temperature) is changed from an initial operating level to a desired final operating level. More specifically, means are provided for alternately rendering the current limit controller 20 operative so that current is applied to the control winding 16 and nonoperative so that no current is applied to the control winding, the current flowing through the heater element 12 and thus the temperature in the furnace 13 being controlled thereby so as to change the furnace temperature at a desired rate or slope. For this purpose, a rate controller 25 (FIG. 2) is provided which alternately renders the current limit controller operative and nonoperative in a manner determined by the presetting of a manual rate selector 26 so that, as will become apparent hereinafter, the temperature in the furnace is changed at a desired rate from the initial temperature level to the desired final temperature level.

The current limit controller 20 as modified to cooperate with the rate controller 25 is illustrated in schematic form in FIG. 8. The previously-described components of the current limit controller will be given the same reference numerals in FIG. 8 as in FIG. 4, and the components added in FIG. 8 for rate control operation are distinguished by illustrating them in heavier lines. As shown in FIG. 8, a variable potentiometer 85 is connected across the control potentiometer 22. The wiper or contact arm 85a of this additional potentiometer is driven from the uppermost position toward the lowermost position at a desired rate by a variable speed driving motor 86 which operates at a speed selected by manual adjustment of the rate selector 26. Thus, the position of the arm 85a changes at a selected rate, and the voltage on that arm decreases at a corresponding rate which is representative of the desired temperature slope in degrees per hour.

A differential responsive transistor network senses to the differential voltage between contact arms 22a and 85a of potentiometers 22 and 85 to control the charging of the capacitor 75. The differential responsive transistor network includes a pair of NPN type transistors 89 and 90 which have their base electrodes respectively connected to contact arms 85a and 22a. The emitters of transistors 89 and 90 are connected to line L2 through a resistor 92. Additionally, the collector of transistor 89 is connected to line L3 through a normally closed manual switch 93 and the collector of transistor 90 is similarly connected through a resistor 94.

When contact arm 22 is positive with respect to contact arm 85a (i.e., when actual furnace temperature is below the desired furnace temperature), transistor 90 is rendered conductive and transistor 89 is rendered nonconductive. Conversely, when contact arm 85a is positive with respect to contact arm 22a (i.e., when actual furnace temperature is above the desired furnace temperature), transistor 89 is rendered conductive and transistor 90 is rendered nonconductive.

For the purpose of controlling the charging of capacitor 75 in response to operation of the transistors in the differential transistor network, a charge controlling transistor 95 of the PNP type is provided which has its emitter-collector circuit connected in series with the charging resistor 76 and the capacitor 75. The base of transistor 95 is connected to the collector of transistor 90 through a current limiting resistor 96. The base of transistor 95 is driven negative with respect to the emitter thereof when transistor 90 conducts due to the drop across resistor 94, so that transistor 95 is rendered conductive. Accordingly, during the time period when contact arm 22a is positive with respect to contact arm 85a and transistor 90 is conductive, transistor 95 is rendered conductive so that capacitor 75 is permitted to charge therethrough. Thus, the rectifier 48 is rendered conductive and current is supplied to the control winding 16 as determined by operation of the current limit controller. Conversely, when the contact arm 85a is positive with respect to contact arm 22a and the transistor 90 is nonconductive, the base of transistor 95 is, in effect, held at the same potential as the emitter thereof so that conduction through the emitter-collector circuit is prohibited. Under these conditions, capacitor 75 is not permitted to charge and no current is permitted to flow through the control winding 16 of the saturable reactor. Thus, the impedance of the reactor 11 (FIG. 2) is at its maximum value, and the heating element 12 is, in effect, turned off.

As previously mentioned, the contact arm 85a is driven from the uppermost portion of potentiometer 85 to the lowermost portion thereof at a rate determined by the selector 26 acting on the variable speed driving motor 86. Thus, the voltage appearing on contact arm 85a represents (i.e., is inversely proportional to) the instantaneous desired furnace temperature corresponding to a selected ramp or slope. The voltage appearing on the contact arm 22a, on the other hand, represents (i.e., is inversely proportional to) the actual furnace temperature. If the actual temperature is above or below the desired slope temperature, then transistor 95 is made nonconductive or conductive, respectively. More specifically, when the contact arm 85a is driven negative in potential with respect to the contact arm 22a, transistor 95 is rendered conductive and more average current is caused to flow through the control winding 16 of the saturable reactor. Under these conditions, the temperature in the furnace will be increased at a more rapid rate so that the speed with which the contact arm 22a is moving from the uppermost portion of the potentiometer 22 to the lowermost portion thereof increases. It follows that a point will be reached when contact arm 85a goes positive in potential with respect to contact arm 22a so that the transistor 95 is rendered nonconductive and the flow of current to the control winding 16 is prohibited. Under these conditions, the heating element 12 is, in effect, turned off so that the temperature remains steady or even decreases. The contact arm 85a continues to move, however, and until it again becomes positive with respect to the contact arm 22a, thereby causing the impedance of reactor 11 to decrease so that heating of the furnace is resumed.

Accordingly, the current limit controller 20 is alternately rendered operative and nonoperative according to a desired, selectable rate function so that the temperature in the furnace is increased at a desired rate. If the driving motor 86 is caused to run at a high speed, contact arm 85a will be driven from the uppermost portion of potentiometer 85 to the lowermost portion thereof at a high speed so that the current limit controller is rendered operative during a greater portion of the sweep of the potentiometer 85. Thus, the temperature in the furnace will be increased at a greater rate. Conversely, if the driving motor 86 is set at a slow speed, the contact arm 85a is driven at a slow speed so that the current limit controller is rendered operative during a lesser portion of the sweep of the contact arm 85a and the temperature in the furnace will be increased at a slower rate.

The manual switch 93 permits the apparatus of FIG. 8 to be operated optionally only as a current limit controller, in the manner described with reference to FIG. 4. If the switch 93 is opened, transistor 89 is rendered nonconductive, and transistor 90 is thus rendered permanently conductive. This means that transistor 95 is held in a conductive state so that the capacitor 75 charges and discharges to control the conduction of rectifier 48 and the control current through winding 16, just as described above with reference to FIG. 4.

Current limiting control, rate control and proportional control

The systems described with reference to FIGS. 4 and 8 operate to bring the temperature of the furnace up to a desired operating level, either as rapidly as possible or at a predetermined rate. In each instance, so long as the actual furnace temperature is below the desired furnace temperature (as determined by the mercury switch 24 in the first case, and as determined by the selected rate or slope in the second case), the heater element is turned substantially "full on," subject always to automatic limiting to a safe value of the current drawn by the heater element. On the other hand, when the actual furnace temperature is above the desired furnace temperature, the heating element is turned substantially "full off," i.e., the saturable reactor is caused to present its maximum impedance by cutting off all current to the control winding 16. For many purposes, such "on-off" control action is adequate, even though the actual furnace temperature may hunt or swing to some extent above or below the desired temperature.

In many applications, however, it is desirable to maintain accurately the final furnace temperature without overshoot and hunting, and for this purpose the energy or current supplied to the heating element 12 must be controlled so that it is proportional to the magnitude of the temperature error. In the embodiment shown by FIGS. 2 and 9, the current limit controller 20 and the rate controller 25 are so modified as to provide proportional control action as the furnace temperature rises to within a specified percentage of the desired final operating temperature.

Further in accordance with this feature of the present invention, means are provided for negating the effect of the rate controller 25 when the temperature in the furnace attains a predetermined temperature level so that, subsequent thereto, the amount of current flowing through the control winding of the saturable reactor is solely determined by the difference between the actual temperature and the final desired temperature. For this purpose, a temperature controller 28 is provided which exerts an overriding influence on the current limit controller 20 when the temperature in the furnace has attained a predetermined level, e.g., 90% of the desired final temperature. A normally open mercury switch 29 (FIG. 2) is provided in the potentiometer recorder 18 and arranged (by means not shown) to close when the furnace temperature rises to within 10% of the desired final temperature level. Such closure of the switch 29 deenergizes a relay 30. When the relay is deenergized, its contact 30a is actuated (as more fully described below) and a proportional temperature controller 28 is responsive to the difference in voltage between the contact arms 31a and 32a of a pair of potentiometers 31 and 32 in the recorder 18. Like the control potentiometer 22, the contact arm 31a of the potentiometer 31 is at a position corresponding to the temperature in the furnace 13. The contact arm 32a of potentiometer 32 is manually preset to a position representing a desired final temperature level by adjustment of a manual control 34.

As will be apparent later, the temperature controller 28 responds to the magnitude and polarity of the differential voltage appearing between the contact arms 31a and 32a to cause the current limit controller 20 to vary the current through the heating element 12 in proportion to the temperature error. Accordingly, the current flowing through the control winding 16 of the saturable reactor is varied according to the difference in positions of the contact arms 31a and 32a, the former being dependent upon the temperature in the furnace 13. Subsequently, when the contact arm 31a has moved to a position indicative that actual furnace temperature is equal to or greater than the desired final temperature, the current limit controller 20 is rendered nonoperative so that no current is thereafter transmitted through the control winding 16, and the heating element 12 is turned substantially fully off.

FIG. 9 illustrates the details of a preferred embodiment for accomplishing such proportional control, in conjunction with current limiting control and rate control. Since the current limiting operation and rate control operation have already been described with reference to FIGS. 4 and 8, only the circuit modifications (shown in heavier lines in FIG. 9) and their effect in producing proportional control action need be described in reference to FIG. 9. It should be noted that, in this arrangement, the temperature controller 28 takes the place of the mercury switch 24 and, accordingly, the mercury switch has been deleted.

Referring to FIG. 9, the base of transistor 95 is connected to the collector of transistor 90 through the normally open contact 30b of a relay 30. The relay 30 is connected to an A.C. supply through the normally closed contact arm 100a of a relay 100 so that the relay 30 is normally energized and the contact arm 30a thereof is normally in engagement with contact 30b. When the mercury switch 29 closes and energizes relay 100 to open contact arm 100a, then relay 30 is deenergized and switch arm 30 moves to contact 30c.

When the furnace temperature is below 90% of the desired final temperature, switch 29 is open and contact arm 30a engages contact 30b. This connects the base of transistor 95 to the collector of transistor 90. The current limit controller 20 and rate controller 26 then operate in exactly the same way as described above with reference to FIG. 8.

When the switch 29 closes, at 90% of the desired final temperature, the relay 30 is deenergized and the base of transistor 95 is connected to the temperature controller 28 through relay contact arm 30a and contact terminal 30c. Under these conditions, the temperature controller 28 is connected between the base and emitter of transistor 95 and, thus, controls conduction of the latter.

As previously mentioned, the temperature controller utilizes the potentionmeters 31 and 32 which are physically located in the potentiometer 18 (FIG. 2). The contact arm 31a is at a position determined by the actual temperature in the furnace and the contact arm 32a is preset to a desired position corresponding to a desired final temperature level. As may be seen by reference to FIG. 9, the potentiometers 32 and 31 are connected in parallel across a D.C. voltage source formed by a full wave rectifier 105 connected to A.C. supply lines. The output of the rectifier 105 is smoothed by an R-C filter and is regulated by a Zener diode 106 to a desired level, for example, nine volts. Thus, the potentiometers 31 and 32 function as a bridge network, the bridge output signal appearing between the contact arms 31a and 32a which in turn are respectively connected to the base and emitter of transistor 95. The signal or voltage between the contact arms 31a, 32a is a differential control signal, i.e., an error signal, which varies according to the difference between the desired final set point temperature (determined by the setting of contact arm 32a) and the actual temperature (represented by the position of the contact arm 31a).

The potentiometer 31 is of the "limited span" type familiar to those skilled in the art. That is, its contact arm 31a is so controlled in position that, when the temperature in the furnace is 10% below the desired final temperature, the contact arm is at the lower end marked "L." As the temperature in the furnace increases, the contact arm 31a moves progressively up toward the end marked "H."

Accordingly, when the temperature in the furnace rises to within 10% of the desired final temperature (and the switch 29 closes), the contact arm 32a is positive in potential by a wide margin with respect to the contact arm 31a, so that the emitter of transistor 95 is made positive in potential with respect to the base thereof. Under these conditions, the transistor 95 is conductive, and its effective impedance, determined by the magnitude of the emitter-base current, is very low. This means that the capacitor 75 charges rapidly during each pulse of the waveform II (FIG. 5), and the controlled rectifier 48 is made conductive at an early instant during each pulse of the waveform I (FIG. 5), as indicated generally by FIG. 7B. The control current supplied to the winding 16 thus has a high average value, and the impedance of reactor 11 is low so that the current drawn by heating element 12 is high.

However, as the furnace temperature continues to rise, and the contact arm 31a moves upwardly so as to become more positive in potential, the magnitude of the voltage difference between contact arm 31a and 32a becomes progressively less. As a result, the control current flowing from the emitter to the base of transistor 95 progressively decreases and the emitter-collector resistance of the latter progressively increases. This means that the capacitor 75 will charge with a progressively increased time constant during each pulse of the waveform II (FIG. 5), so that the voltage across the capacitor will not reach the critical value necessary to turn on transistor 57 until progressively later instants during each waveform pulse. Therefore, the rectifier 48 will be gated "on" at progressively later instants and the impedance of the saturable reactor 11 will be progressively increased. Thus the smaller the temperature error (i.e., the closer the actual temperature approaches to the final desired temperature) the smaller will be the current passed through the heating element 12, and the slower the rate of heat generation. This proportional control or reduction in energy input as the temperature error decreases, results in considerably less overshoot beyond the desired final temperature, and closer control of the final temperature once it is reached.

By the time the actual temperature reaches the desired final temperature, the potentiometer wipers 31a, 32a will be at the same potential, and thus the transistor 95 will be rendered nonconductive. The capacitor 75 can no longer charge, and the gate-controlled retifier will not conduct at all during the pulses of waveform I (FIG. 5). Accordingly, the saturable reactor 11 will present its maximum impedance, and the heater element 13 will thus, in effect, be turned off. If the furnace temperature should thereafter fall slightly below the desired temperature, the transistor 95 will be made slightly conductive, so that the capacitor will again be able to charge slowly and the current to the heater element 12 will be increased slightly to return the furnace temperature to the desired value.

It may be observed that during the early stages of starting up the furnace, the capacitor 75 charges at a fast rate, and the instant in time at which transistor 55 is turned off (and gate-controlled rectifier 48 turned on) is determined by the potential of the potentiometer contact arm 22a. However, by the time the furnace approaches the final desired temperature, the potential of the arm 22a is relatively low, and it is the variation in the rate of charging of the capacitor 75 which determines and controls the instants at which the transistor 55 is "turned off" to trigger the rectifier 48 on.

From the foregoing, it will be apparent that the present invention brings to the art a very simple and compact transistorized current limit controller which makes possible rapid heating of a furnace without overloading during the early stages when the resistance of the heating element 12 is low. Moreover, by a relatively simple modification (FIG. 8), rate or slope control may be obtained in conjunction with current limit control, and by a further simple modification (FIG. 9), proportional control action near the final control point may be obtained.

I claim as my invention:

1. In a system for supplying energy from a source to an energy utilization device which changes a variable condition, the utilization device being characterized by a decrease in its energy-consuming ability as the value of said condition increases, the combination comprising, means for creating a signal which varies in accordance with the instantaneous value of said condition, control means interposed between said source and said utilization device for presenting a variable opposition to the transfer of energy from the former to the latter, and means responsive to said signal for causing the opposition presented by said control means to vary inversely with changes in the value of the controlled condition, so that the rate of energy transfer from the source to the device remains substantially constant as the values of the controlled condition and the energy-consuming ability of the utilization device change.

2. In a system for supplying energy from a source to an energy utilization device which changes a variable condition, the utilization device being characterized by a decrease in its energy-consuming ability as the value of said condition increases, the combination comprising, means for producing a signal which varies in accordance with the instantaneous value of said condition, control means interposed between said source and said utilization device for presenting a variable impedance to the transfer of energy from the source to the device, and means responsive to said signal for causing said control means to present a predetermined high impedance when said variable condition has a low value and to present a progressively decreasing impedance as the value of said condition increases so that the energy transferred to said device is substantially maintained at a limited rate as the condition increases.

3. For use in a system for controlling at a desired upper value the temperature produced by a heating element having a positive temperature coefficient of resistance and energized from an electrical power source, an arrangement for holding to a safe level the power transfer during initial heat-up as the temperature is being increased from a low value to the desired upper value, such arrangement comprising, in combination, means for producing a signal which varies according to the instantaneous value of said temperature, a controllable impedance interposed between said source and said element to govern the transfer of power to said element, and means responsive to said signal for causing such impedance to vary inversely with changes in the value of said temperature so that the power transferred to said element is substantially maintained at a limited rate as the temperature changes.

4. In a system for controlling the temperature produced by a heating element having a positive temperature coefficient of resistance and energized from an electrical power source, the combination comprising, means for producing a signal which varies inversely according to the instantaneous value of said temperature, a controllable impedance interposed between said source and said element to govern the transfer of power to said element, means for producing a recurring, exponentially rising voltage waveform, a gate-controlled rectifier and a pulsating voltage source for energizing said rectifier, means for triggering said rectifier into conduction during each pulsation of said voltage source but at an instant when said voltage waveform rises to a predetermined magnitude in relation to said signal, and means for varying said impedance inversely in accordance with changes in the average current through said gate-controlled rectifier, whereby said impedance decreases as the values of the controlled temperature and the resistance of said heating element increase.

5. In a system for controlling the temperature in a furnace heated by a resistance element having a positive temperature coefficient of resistance and energized from an electrical source, the combination comprising, a variable impedance adapted to be serially interposed between said source and said element, a source of pulsating voltage, means energized from said voltage source for producing a first voltage which varies inversely with the temperature in said furnace, a capacitor and resistance means for repeatedly charging and discharging the capacitor by application of said pulsating voltage thereto to produce a recurring, exponentially rising second voltage across said capacitor, and means for comparing said first and second voltages and for controlling the value of said impedance in accordance with the instant in each voltage pulsation at which said second voltage reaches a predetermined magnitude in relation to the first voltage.

6. In a system for controlling the temperature in a furnace heated by a resistance element having a positive temperature coefficient of resistance and energized from an electrical source, the combination comprising, a saturable reactor adapted to be connected in series between said source and said element, said saturable reactor having a control winding which causes the impedance of the reactor to vary inversely according to the magnitude of average direct current passed through such winding, a source of pulsating voltage, a gate-controlled rectifier connected in series with said control winding across said pulsating source, means for producing a first voltage which varies inversely with the temperature in said furnace, a capacitor and resistance means for repeatedly charging and discharging the same by application of said pulsating voltage thereto to produce a recurring, exponentially rising second voltage across said capacitor, and means for comparing said first and second voltage and for rendering said gate-controlled rectifier conductive at those instants when the second voltage reaches a predetermined magnitude in relation to the first voltage so that the impedance of said reactor is initially high when the furnace temperature is low, and progressively decreases as the furnace temperature increases.

7. In a system for controlling the temperature in a furnace heated by a resistance element having a positive temperature coefficient of resistance and energized from an electrical source, the combination comprising, a saturable reactor adapted to be connected in series between said source and said element, said saturable reactor having a control winding which causes the impedance of the reactor to vary inversely according to the magnitude of average direct current passed through such winding, a source of pulsating voltage, a gate-controlled rectifier connected in series with said control winding across said pulsating source, means for producing a first voltage which varies inversely with the temperature in said furnace, a capacitor and resistance means for repeatedly charging and discharging the same by application of said pulsating voltage thereto to produce a recurring, exponentially rising second voltage across said capacitor, and means for comparing said first and second voltage and for rendering said gate-controlled rectifier conductive at those instants when the second voltage reaches a predetermined magnitude in relation to the first voltage so that the impedance of said reactor is initially high when the furnace temperature is low, and progressively decreases as the furnace temperature increases, said resistance means being adjustable to change the rate at which said capacitor charges and thereby to change the value of impedance presented by said reactor at any given value of the controlled temperature.

8. In a system for supplying energy from a source to an energy utilization device which changes a variable condition, the utilization device being characterized by a decrease in its energy-consuming ability as the value of said condition increases, the combination comprising, first means for creating a first signal which varies in accordance with the instantaneous value of said condition, control means interposed between said source and said utilization device for presenting a variable opposition to the transfer of energy from the former to the latter, second means responsive to said first signal for causing the opposition presented by said control means to vary inversely with changes in the value of the controlled condition, third means for creating a second signal which varies at a predetermined time rate indicative of a desired rate of increase in said variable condition, and fourth means responsive to said first and second signals for disabling said second means and for causing said control means to present its maximum opposition whenever the actual value of said variable condition is greater than the desired value represented by said second signal.

9. In a system for supplying energy from a source to an energy utilization device which changes a variable condition, the utilization device being characterized by a decrease in its energy-consuming ability as the value of said condition increases, the combination comprising, means for creating a first signal which varies in accordance with the instantaneous value of said condition, control means interposed between said source and said utilization device for presenting a variable opposition to the transfer of energy from the former to the latter, means responsive to said first signal for causing the opposition presented by said control means to vary inversely with changes in the value of said controlled condition, means for producing a slope control signal which changes at a predetermined rate with time to represent progressively changing desired values of said condition, and means jointly responsive to said first and slope signals for causing said control means to substantially prevent transfer of energy to said device whenever the actual value of said condition represented by said first signal exceeds the desired value represented by said slope signal.

10. In a system for supplying energy from a source to an energy utilization device which changes a variable condition, the utilization device being characterized by a decrease in its energy-consuming ability as the value of said condition increases, the combination comprising, means for producing a first signal which varies in accordance with the instantaneous value of said condition, control means interposed between said source and said utilization device for presenting a variable impedance to the transfer of energy from the source to the device, limit control means responsive to said signal for causing said control means to present a predetermined high impedance when said variable condition has a low value and to present a progressively decreasing impedance as the value of said condition increases, means for generating a slope control signal which progressively changes at a predetermined time rate to represent a progressively changing desired value of said condition, and means jointly responsive to said first and slope signals for modifying the operation of said limit control means whenever the actual value of said condition exceeds the desired value represented by said slope signal to cause said control means to present its maximum impedance.

11. In a system for controlling the temperature produced by a heating element having a positive temperature coefficient of resistance and energized from an electrical power source, the combination comprising, means for producing a first signal which varies according to the instantaneous value of said temperature, a controllable impedance interposed between said source and said element to govern the transfer of power to said element, means responsive to said first signal for causing said impedance to vary inversely with changes in the value of said condition, means for producing a slope control signal which varies according to a predetermined rate and by its value represents desired temperatures, and means jointly responsive to said first and slope signals for modifying the operation of said signal-responsive means to cause the latter to make said impedance have its maximum value whenever the actual temperature represented by said first signal exceeds the desired temperature represented by said slope signal.

12. In a system for controlling the temperature in a furnace or the like heated by a resistance element having a positive temperature coefficient of resistance and energized from an electrical source, the combination comprising, a saturable reactor adapted to be connected in series between said source and said element, said reactor having a control winding to vary the reactive impedance created between the source and the element, a source of pulsating voltage, a gate-controlled rectifier connected in series with said control winding across said pulsating source, means for producing a first voltage which varies inversely with the temperature in said furnace, a capacitor and resistance means for repeatedly charging and discharging the capacitor and in response to said pulsating voltage to produce a recurring, exponentially rising second voltage across said capacitor, means for comparing said first and second voltage and for rendering said gate-controlled rectifier conductive at those instants when the second voltage reaches a predetermined magnitude in relation to the first voltage so that the impedance of said reactor is initially high when the furnace temperature is low and progressively decreases as the furnace temperature increases, means for producing a slope control voltage which progressively decreases with time at a predetermined rate, and means responsive to said first and slope voltages for preventing the charging of said capacitor whenever the slope voltage exceeds the first voltage so that conduction of said rectifier is prevented and the impedance of said reactor has its maximum value.

13. In a system for controlling the temperature in a furnace or the like heated by a resistance element having a positive temperature coefficient of resistance and energized from an electrical source, the combination comprising, a saturable reactor adapted to be connected in series between said source and said element, said reactor having a control winding to vary the impedance presented by the reactor, a source of pulsating voltage, a gate-controlled rectifier connected in series with said control winding across said pulsating source, means for producing a first voltage which varies inversely with the temperature in said furnace, a capacitor and resistance means for repeatedly charging and discharging the capacitor and in response to said pulsating voltage to produce a recurring, exponentially rising second voltage across said capacitor, means for comparing said first and second voltage and for rendering said gate-controlled rectifier conductive at those instants when the second voltage reaches a predetermined magnitude in relation to the first voltage so that the impedance of said reactor is initially high when the furnace temperature is low and progressively decreases as the furnace temperature increases, means for producing a slope control voltage which progressively decreases with time at a predetermined rate, a transistor having its emitter-collector terminals connected in series with said capacitor and resistance means, means for rendering said transistor fully when said first voltage exceeds said slope voltage, and means for rendering said transistor nonconductive when said slope voltage exceeds said first voltage so that charging of said capacitor is prevented, conduction of said rectifier is prevented and the reactor is at its maximum impedance value.

14. In a system for supplying energy from a source to an energy utilization device to change a variable condition from a first value to a final desired value, the utilization device being characterized by a decrease in its ability to consume energy from said source as the value of said condition increases, the combination comprising, means for creating a first signal which varies in accordance with the instantaneous value of said condition, control means interposed between said source and said utilization device for presenting a variable opposition to the transfer of energy from the former to the latter, means responsive to said first signal for causing the opposition presented by said control means to vary inversely with changes in said condition, means for producing an error signal which varies in accordance with the difference between the instantaneous value of said condition and the desired final value thereof, normally disabled means responsive to said error signal for modifying the operation of said first signal-responsive means to cause said control means to present an opposition which varies substantially inversely with said error signal, and means for enabling said last-named means in response to the variable condition approaching to within a predetermined percentage of the desired final value.

15. In a system for supplying energy from a source to an energy utilization device which changes a variable condition, the utilization device being characterized by a decrease in its ability to consume energy from said source as the value of said condition increases, the combination comprising, means for producing a first signal which varies in accordance wtih the instantaneous value of said condition, control means interposed between said source and said utilization device for presenting a variable impedance to the transfer energy from the source to the device, means responsive to said first signal for causing said control means to present a predetermined high impedance when said variable condition has a low value and to present a progressively decreasing impedance as the value of said condition increases, means for producing a differential control signal which varies in accordance with the difference between the instantaneous value of said condition and a desired value thereof, and normally inactive means rendered active when said condition is within a predetermined percentage of the desired value and responsive to said differential signal for modifying the operation of said first signal-responsive means to cause said control means to vary said impedance inversely according to the magnitude of said differential signal.

16. In a system for controlling the temperature produced by a heating element having a positive temperature coefficient of resistance and energized from an electrical power source, the combination comprising, means for producing a first signal which varies according to the instantaneous value of said temperature, a controllable impedance interposed between said source and said element to govern the transfer of power to said element, control means responsive to said signal for causing said impedance to vary inversely with changes in the value of said condition, means for producing a differential control signal which in magnitude is proportional to the difference between a desired value of said temperature and the instantaneous value thereof, and means responsive to said differential signal when said condition is within a predetermined percentage of the desired value for modifying said control means so that the latter causes said impedance to vary inversely with said differential signal and in a manner that said impedance is never less than it would be under the normal operation of said control means.

17. In a system for controlling the temperature in a furnace or the like heated by a resistance element having a positive temperature coefficient of resistance and energized from an electrical source, the combination comprising, a saturable reactor adapted to be connected in series between said source and said element, said reactor having a control winding to vary the impedance presented by the reactor, a source of pulsating voltage, a gate-controlled rectifier connected in series with said control winding across said pulsating source, means for producing a first voltage which varies inversely with the temperature in said furnace, a capacitor and resistance means for repeatedly charging and discharging the capacitor in response to application of said pulsating voltage thereto to produce a recurring, exponentially rising second voltage across said capacitor, means for comparing said first and second voltage and for rendering said gate-controlled rectifier conductive at those instants when the second voltage reaches a predetermined magnitude in relation to the first voltage so that the impedance of said reactor is initially high when the furnace temperature is low, and progressively decreases as the furnace temperature increases, means for producing a differential control voltage proportional in magnitude to the difference between a desired value of said temperature and the instantaneous value thereof, and means responsive to said differential voltage for increasing the charging time constant of said capacitor and resistance means as said differential signal decreases, thereby to increase the impedance of said reactor as the temperature approaches the desired value.

18. In a system for controlling the temperature in a furnace or the like heated by a resistance element having a positive temperature coefficient of resistance and energized from an electrical source, the combination comprising, a saturable reactor adapted to be connected in series between said source and said element, said reactor having a control winding to vary the impedance presented by the reactor, a source of pulsating voltage, a gate-controlled rectifier connected in series with said control winding across said pulsating source, means for producing a first voltage which varies inversely with the temperature in said furnace, a capacitor and resistance means for repeatedly charging and discharging the capacitor in response to application of said pulsating voltage thereto to produce a recurring, exponentially rising second voltage across said capacitor, means for comparing said first and second voltage and for rendering said gate-controlled rectifier conductive at those instants when the second voltage reaches a predetermined magnitude in relation to the first voltage so that the impedance of said reactor is initially high when the furnace temperature is low, and progressively decreases as the furnace temperature increases, means for producing a differential control voltage proportional in magnitude to the difference between a desired value of said temperature and the instantaneous value thereof, a transistor having its emitter-collector terminals connected in series with said capacitor and resistance means, and means for applying said differential voltage to the emitter-base terminals of said transistor to control the conduction of the latter so that the charging time of the capacitor and the impedance of said reactor increases as the temperature approaches the desired value.

19. In a system for supplying energy from a source to an energy utilization device which changes a variable condition, the utilization device being characterized by a decrease in tis energy-consuming ability as the value of said condition increases, the combination comprising, means for creating a first signal which varies in accordance with the instantaneous value of said condition, control means interposed between said source and said utilization device for presenting a variable opposition to the transfer of energy from the former to the latter, means responsive to said first signal for causing the opposition presented by said control means to vary inversely with changes in said condition, means for producing a slope control signal which changes at a predetermined rate with time to represent progressively changing desired values of said condition, means responsive jointly to said first and slope signals for causing said control means to substantially prevent transfer of energy to said device whenever the actual value of said condition represented by said first signal exceeds the desired value represented by said slope signal, means for producing a differential error signal proportional in magnitude to the difference between a final desired value of said condition and the instantaneous value thereof, and means responsive to said differential error signal for modifying the operation of said means responsive to said first signal and for causing said control means to present an opposition which varies inversely with said error signal after said condition has come within a predetermined percentage of the final desired value and continues to approach the latter.

20. In a system for controlling the temperature in a furnace or the like heated by a resistance element having a positive temperature coefficient of resistance and energized from an electrical source, the combination comprising, a saturable reactor adapted to be connected in series between said source and said element, said reactor having a control winding, a source of pulsating voltage, a gate-controlled rectifier connected in series with said control winding across said pulsating source, means for producing a first voltage which varies inversely with the temperature in said furnace, a capacitor and resistance means for repeatedly charging and discharging the capacitor in response to application of said pulsating voltage thereto to produce a recurring, exponentially rising second voltage across said capacitor, means for comparing said first and second voltage and for rendering said gate-controlled rectifier conductive at those instants when the second voltage reaches a predetermined magnitude in relation to the first voltage so that the impedance of said reactor is initially high when the furnace temperature is low and progressively decreases as the furnace temperature increases, means for providing a slope control voltage which progressively decreases at a predetermined rate, a transistor in series with said capacitor and resistance means, means for normally rendering said transistor fully conductive and for cutting off said transistor whenever said first voltage is less than said slope voltage, means for producing a differential control voltage proportional to the difference between a final desired temperature in said furnace and the instantaneous temperature therein, and means operable in response to the furnace reaching a predetermined percentage of said final desired temperature for varying the conductivity of said transistor in accordance with said differential signal.

21. In a system for supplying energy from a source to an energy utilization device to change a variable condition from a first value to a final desired value, the combination comprising, a control device interposed between said source and said utilization device and presenting a variable opposition to the transfer of energy from the former to the latter, a source of pulsating voltage, a capacitor and resistance means for repeatedly charging and discharging the capacitor in response to application of said pulsating voltage thereto to produce a recurring, exponentially rising first voltage across said capacitor, means responsive to said first voltage for varying the opposition of said control device in direct relation to the time required for said capacitor to charge to a predetermined level, means for producing a differential control signal proportional in magnitude to the difference between the desired final value of said condition and the instantaneous value thereof, and means responsive to said differential signal for increasing the charging time constant of said capacitor and resistance means as said differential signal decreases so that the opposition of said control device increases as the condition approaches the desired value.

22. In a system for supplying energy from a source to an energy utilization device to change a variable condition from a first value to a final desired value, the combination comprising, a control device interposed between said source and said utilization device and presenting a variable opposition to the transfer of energy from the former to the latter, a source of pulsating voltage, a capacitor and resistance means for repeatedly charging and discharging the capacitor in response to application of said pulsating voltage thereto to produce a recurring, exponentially rising first voltage across said capacitor, means responsive to said first voltage for varying the opposition of said control device in direct relation to the time required for said capacitor to charge to a predetermined desired level, means for producing a differential control voltage proportional in magnitude to the difference between the desired final value of said condition and the instantaneous value thereof, a transistor having its emitter-collector terminals connected in series with said capacitor and resistance means, and means for applying said differential voltage to the emitter-base terminals of said transistor to control the conduction thereof so that the charging time of the capacitor increases and the opposition of said control device increases as the condition approaches the desired value.

References Cited by the Examiner

UNITED STATES PATENTS

| | | | |
|---|---|---|---|
| 2,079,466 | 5/1937 | Phillips | 219—503 |
| 2,720,579 | 10/1955 | Morgan | 219—503 |
| 2,798,196 | 7/1957 | Hage | 13—24 |
| 2,920,240 | 1/1960 | Macklem | 323—22 |
| 2,974,237 | 3/1961 | Ehret | 219—499 |
| 2,987,666 | 6/1961 | Manteuffel | 323—22 |
| 2,994,759 | 8/1961 | Lipman. | |
| 3,015,739 | 1/1962 | Manteuffel. | |
| 3,040,158 | 6/1962 | Cutler et al. | 219—210 |
| 3,047,647 | 7/1962 | Harkins et al. | 13—6 |
| 3,089,018 | 5/1963 | Inoue | 219—69 |
| 3,097,314 | 7/1963 | Harriman | 307—88.5 |
| 3,098,919 | 7/1963 | Paulson | 219—501 |
| 3,128,362 | 4/1964 | Clark et al. | 219—398 |
| 3,128,422 | 4/1964 | Brown | 323—122 |
| 3,175,077 | 3/1965 | Fox et al. | 219—501 |
| 3,202,800 | 8/1965 | Phillips et al. | 219—497 |

ANTHONY BARTIS, *Primary Examiner.*

R. M. WOOD, *Examiner.*

L. H. BENDER, *Assistant Examiner.*